US008504348B2

(12) United States Patent
Error

(10) Patent No.: US 8,504,348 B2
(45) Date of Patent: Aug. 6, 2013

(54) USER SIMULATION FOR VIEWING WEB ANALYTICS DATA

(75) Inventor: Christopher R. Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 1412 days.

(21) Appl. No.: 11/669,876

(22) Filed: Jan. 31, 2007

(65) Prior Publication Data

US 2008/0184116 A1 Jul. 31, 2008

(51) Int. Cl.
*G06F 9/45* (2006.01)
(52) U.S. Cl.
USPC .................................................... 703/22
(58) Field of Classification Search
CPC .................................................. G06F 17/5022
USPC ............ 703/20, 22, 23, 26, 6; 715/744–747, 715/825, 704, 833, 730, 764, 767; 717/104, 717/134, 135
See application file for complete search history.

(56) References Cited

U.S. PATENT DOCUMENTS

| | | | |
|---|---|---|---|
| 6,278,966 B1 | 8/2001 | Howard et al. | |
| 6,549,944 B1 | 4/2003 | Weinberg et al. | |
| 6,667,751 B1* | 12/2003 | Wynn et al. | 715/833 |
| 7,043,546 B2 | 5/2006 | Smith et al. | |
| 7,072,935 B2 | 7/2006 | Kehoe et al. | |
| 8,078,626 B1* | 12/2011 | Whitt et al. | 707/751 |
| 2002/0129363 A1* | 9/2002 | McGuire | 725/37 |
| 2002/0147805 A1 | 10/2002 | Leshem et al. | |
| 2003/0126613 A1* | 7/2003 | McGuire | 725/109 |
| 2004/0059746 A1* | 3/2004 | Error et al. | 707/102 |
| 2004/0133671 A1 | 7/2004 | Taniguchi | |
| 2004/0172415 A1 | 9/2004 | Messina et al. | |
| 2004/0221260 A1 | 11/2004 | Martin et al. | |
| 2004/0254942 A1 | 12/2004 | Error et al. | |
| 2005/0021731 A1 | 1/2005 | Sehm et al. | |
| 2005/0102358 A1 | 5/2005 | Gold et al. | |
| 2005/0210416 A1* | 9/2005 | MacLaurin et al. | 715/851 |
| 2005/0223093 A1 | 10/2005 | Hanson et al. | |
| 2006/0190319 A1 | 8/2006 | Hanswadkar | |

OTHER PUBLICATIONS

Milic-Frayling et al, "MS WebScout: Web Navigation Aid and Personal Web History Explorer", Jun. 2002, www2002.org, pp. 1-6.*
Jhaveri et al, "The Advantages of a Cross-Session Web Workspace", 2005, Conference on Human Factors in Computing Systems , pp. 1949-1952.*

(Continued)

*Primary Examiner* — Kamini S Shah
*Assistant Examiner* — Luke Osborne
(74) *Attorney, Agent, or Firm* — Kilpatrick Townsend & Stockton LLP

(57) ABSTRACT

A system creates and shows a display that simulates the websites during a visit, the flow of the visit and the pace of the visit. The system includes a web analytics tool, a data storage, a focus group module and a virtual focus group user interface module. The focus group module interacts with the web analytics tool to extract information related to a particular visit by a visitor. The virtual focus group user interface module creates a user interface that presents a depiction of each website visited and displays those depictions to the user at a pace similar to the visitor's actual interaction with the websites. The user interface also includes input mechanisms to select a particular portion of the visit, modify the pace at which the depictions are presented, find similar visits, as well as other functionality.

23 Claims, 15 Drawing Sheets

OTHER PUBLICATIONS

WWW2002, "The Eleventh International World Wide Web Conference" [online], Apr. 29, 2002, Retrieved from the Internet: <URL: www2002.org/CDROM/poster/index-byauthor.html>.*

PCT International Search Report and Written Opinion, PCT/US08/50808, Jul. 1, 2008, 8 pages.

U.S. Appl. No. 11/669,869, filed Jan. 31, 2007.

Office Action from U.S. Appl. No. 11/669,869, mailed Apr. 1, 2009, 15 pages.

Office Action from U.S. Appl. No. 11/669,869, mailed Dec. 1, 2010, 14 pages.

* cited by examiner

USER SIMULATION FOR VIEWING WEB ANALYTICS DATA

BACKGROUND OF THE INVENTION

1. Field of the Invention

This invention relates generally to systems and methods for web analytics. More particularly, the present invention is related to display of website visitation information and statistics, and specifically to a report that shows websites that were traversed by a user and simulate the visitation experience.

2. Description of the Related Art

Web analytics refers to the analysis of data created by website usage. For instance, web analytics can be used to mine visitor traffic data. A variety of visitor traffic data is measured such as what browser is being used, what links on a given web page were selected, whether a product was purchase, etc. There are number of web analytics tools presently available such as Site Catalyst version 11 from Omniture of Orem, Utah. These tools are able to capture data on website usage, and responsive to a user's request display a variety of different metrics on website usage such fallout/conversion, A/B testing, etc.

It is useful for website operators to be able to discern patterns of visitation to their websites. Website operators, advertisers, and other parties are interested in finding out which web pages within their websites tend to be visited more or less frequently than others. Such information has many uses, including for example: identifying problem areas in a website, pages that tend to lose visitors to other websites, traffic flow for advertising and server load purposes, and the like.

Of particular use are statistics or information describing the visitation path flow that visitors tend to follow. Such statistics include for example, information describing where the visitors tend to enter the site, what pages do they tend to visit first, what pages tend to be visited just after or before other pages, and the like.

Existing web analytics software generally provides some statistics as to site visitation path flow. In general, such techniques include presentation of static reports describing the percentage of visitors that follow particular path flows. For the most part the information presented is accumulation of statistics. One difficulty with such statistical information, is that there is presently not a way to simulate or replicate the experience the visitor had in traversing different web pages.

Thus, there is a need for a system and method for presenting a simulation of the user's experience in viewing websites.

SUMMARY OF THE INVENTION

The present invention overcomes the deficiencies of the prior art with a system including a module for presenting simulations of user interactions with websites. More specifically, the present invention creates a display that simulates the websites during a visit, the flow of the visit and the pace of the visit. In one or more embodiments, the system includes a web analytics tool, a data storage, a focus group module and a virtual focus group user interface module. The web analytics tool captures data regarding website visitation and traffic and stores it in the data storage. The web analytics tool and data storage are adapted to interact and communicate with the focus group module and the virtual focus group user interface module. The focus group module interacts with the web analytics tool to extract information related to a particular visit by a visitor. The focus group module also extracts information for a plurality of visits, possibly by different visitors, related by one or more segments. The information extracted by the focus group module is presented to the user in a unique graphical user interface by the virtual focus group user interface module. The virtual focus group user interface module creates a user interface that presents a depiction of each website visited and displays those depictions to the user at a pace similar to the visitor's actual interaction with the websites. The user interface also includes input mechanisms to select a particular portion of the visit, modify the pace at which the depictions are presented, find similar visits, as well as other functionality.

In one or more embodiments, the present invention includes a method for extracting data related to a visit, a method for presenting data related to a visit, and a method for finding data for visits with similar attributes.

The features and advantages described herein are not all-inclusive, and in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
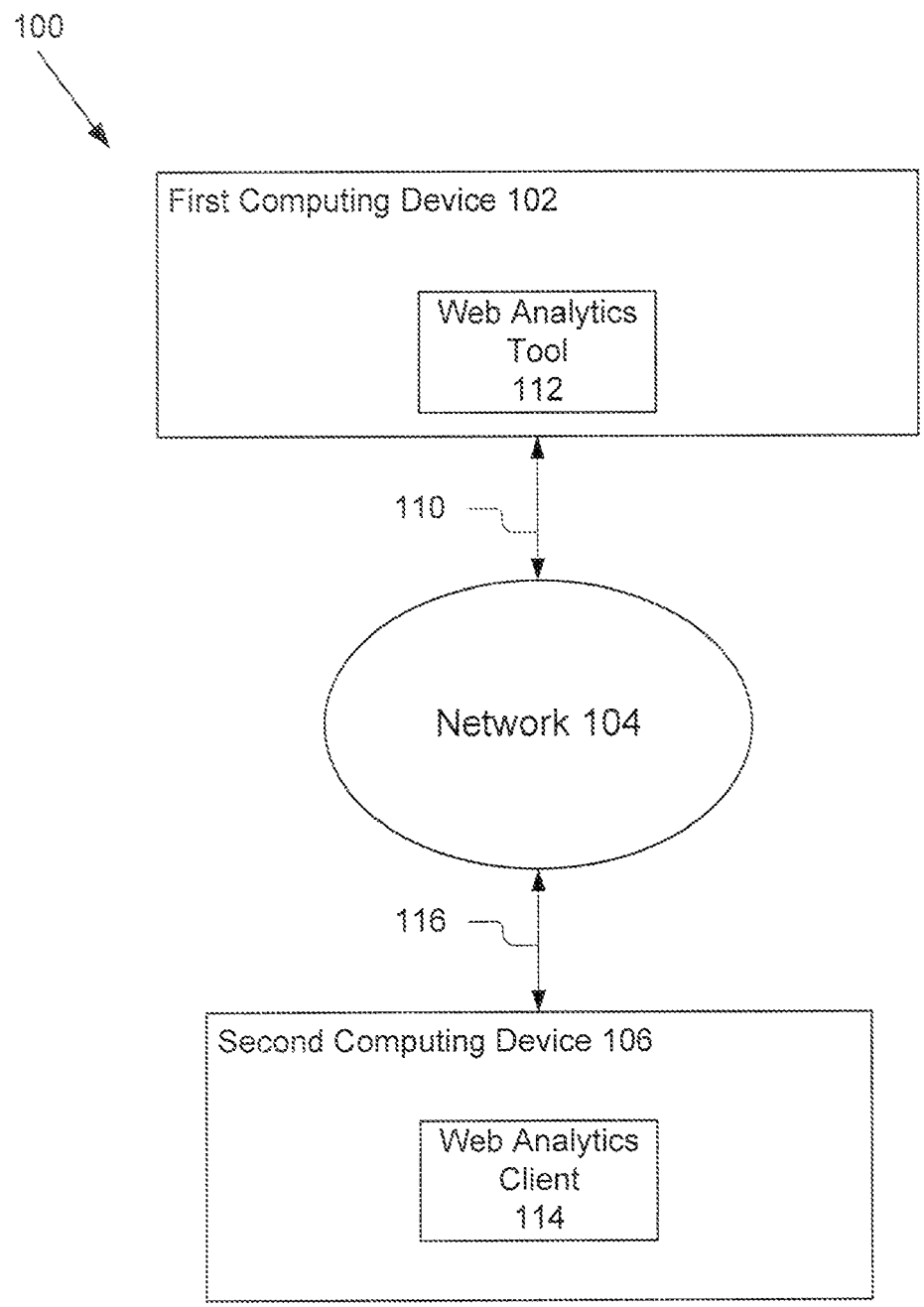
FIG. 1 is a block diagram of an embodiment of a system for simulating interaction with websites based on web traffic data according to the present invention.

A system and methods for simulating a visitor experience for a particular individual over a plurality of websites are described. In this application, the terms visit, visitor, web page, hit, definitions know to those skilled art such as:

A Hit is a request for a file from the web server. Available only in log analysis. A single web-page typically consists of multiple (often dozens) of discreet files, each of which is counted as a hit as the page is downloaded, so the number of hits is really an arbitrary number more reflective of the complexity of individual pages on the website than the website's actual popularity. The total number of visitors or page views provides a more realistic and accurate assessment of popularity.

A Page View is a request for a file whose type is defined as a page in log analysis. An occurrence of the script being run in page tagging. In log analysis, a single page view may generate multiple hits as all the resources required to view the page (images, .js and .css files) are also requested from the web server.

A Visit/Session is a series of requests from the same uniquely identified client with a set timeout. A visit is expected to contain multiple hits (in log analysis) and page views.

A Visitor/Unique Visitor is the uniquely identified client generating requests on the web server (log analysis) or viewing pages (page tagging). A visitor can make multiple visits.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to an embodiment of a simulation presented by a web analytics tool, but the invention is applicable to any computing device such as a client instead of the web analytics tool. Moreover, the simulation or report could be presented with an ASP model.

Reference in the specification to "one embodiment," "an embodiment" or "the embodiment' means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System

A segmentation workbench system 100 of the present invention providing web analytics analysis capability using a first computing device 102 and a second computing device 104 is shown in FIG. 1. The system 100 preferably includes a first computing device 102, a network 104 and a second computing device 106. The present invention will now be described in the context of a single first computing device 102 communicating with a single second computing device 106 for ease of understanding and convenience; however, a more typical application may be first computing device 102 communicating with many second computing devices 106. In general, the present invention provides a web analytics tool 112 with flexibility and speed that operates using the network 104, the first computing device 102 and the second computing device 106.

The first computing device 102 is a conventional computing device such as a server and includes a connection to the network via line 110 and is capable of executing various programs such as the present invention. The first computing device 102 preferably includes storage devices (not shown) for temporary and permanent storage such as memory and hard disk drive arrays. The first computing device 102 also includes applications, programs and other code executable on the first computing device 102. The computing device 102 preferably includes a web analytics tool 112 and operates as a web server for web analytics and reporting for providing data from a data set representing interaction with web pages such as SiteCatlyst V.11 provided by Omniture of Orem, Utah. The web analytics tool 112 also includes a segmentation workbench; the functionality it provides, the user interfaces it generates and its operation is disclosed in detail below. When operating on the first computing device 102 these tools provide data to the second computing device 106 for presentation to the user. An exemplary display of such information by the second computing device 106 is shown below with reference to FIG. 7 et seq.

The network 104 is any one of a conventional type such as the Internet, a local area network (LAN), wireless network, or a wide area network (WAN). The network 104 has predefined protocols for sending packets of data between devices coupled to the network 104. The network 104 may be of any conventional types and have any one of various topologies.

The second computing device 106 is a conventional computing device such as a personal computer, but also includes programs or code providing the segmentation workbench capability of the present invention. The second computing device 106 includes a web analytics client 114 responsive to the web analytics tool 112 of the first computing device 102 and user input to meet the web analytics and reporting needs of the user.

Figure 2:
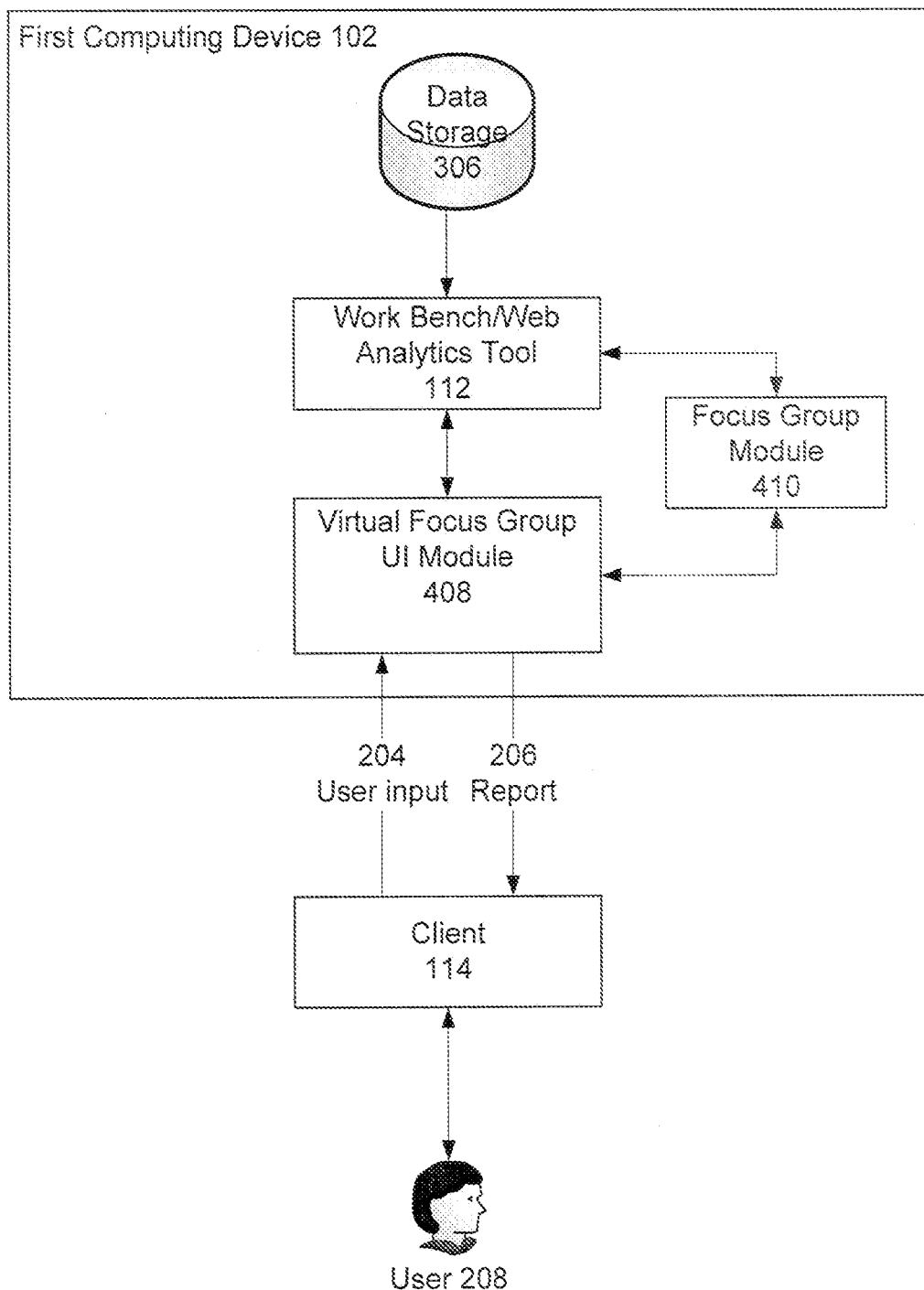
FIG. 2 is functional block diagram of an embodiment of the interaction of the system of the present invention with a user, a web analytics tool and a database.

Referring now also to FIG. 2, a block diagram showing the interaction of the components of the present invention in a segmentation workbench system 100 will be described. The virtual focus group user interface (UI) module 408 presents simulations/reports 206 generated by the web analytics tool 112. The virtual focus group UI module 408 also presents an interface that allows a user 208 to provide user input 204 that is sent to the focus group module 410. In this manner, user 302 can interact with simulations/reports 206. The virtual focus group UI module 408 is coupled for communication with the focus group module 410 and the web analytics tool 112.

The web analytics tool 112 is coupled to a data set or database in data storage 306. The data set can then be further manipulated by the web analytics tool 112 for the creation of reports, display to the user, tracking, targeting, and notification of users based on the data. Those skilled in the art will recognize that the functionality provided by the virtual focus group UI module 408 may be integrated into the focus group module 410 and in such an embodiment the focus group module 410 would interact directly with the client 114.

Figure 3:
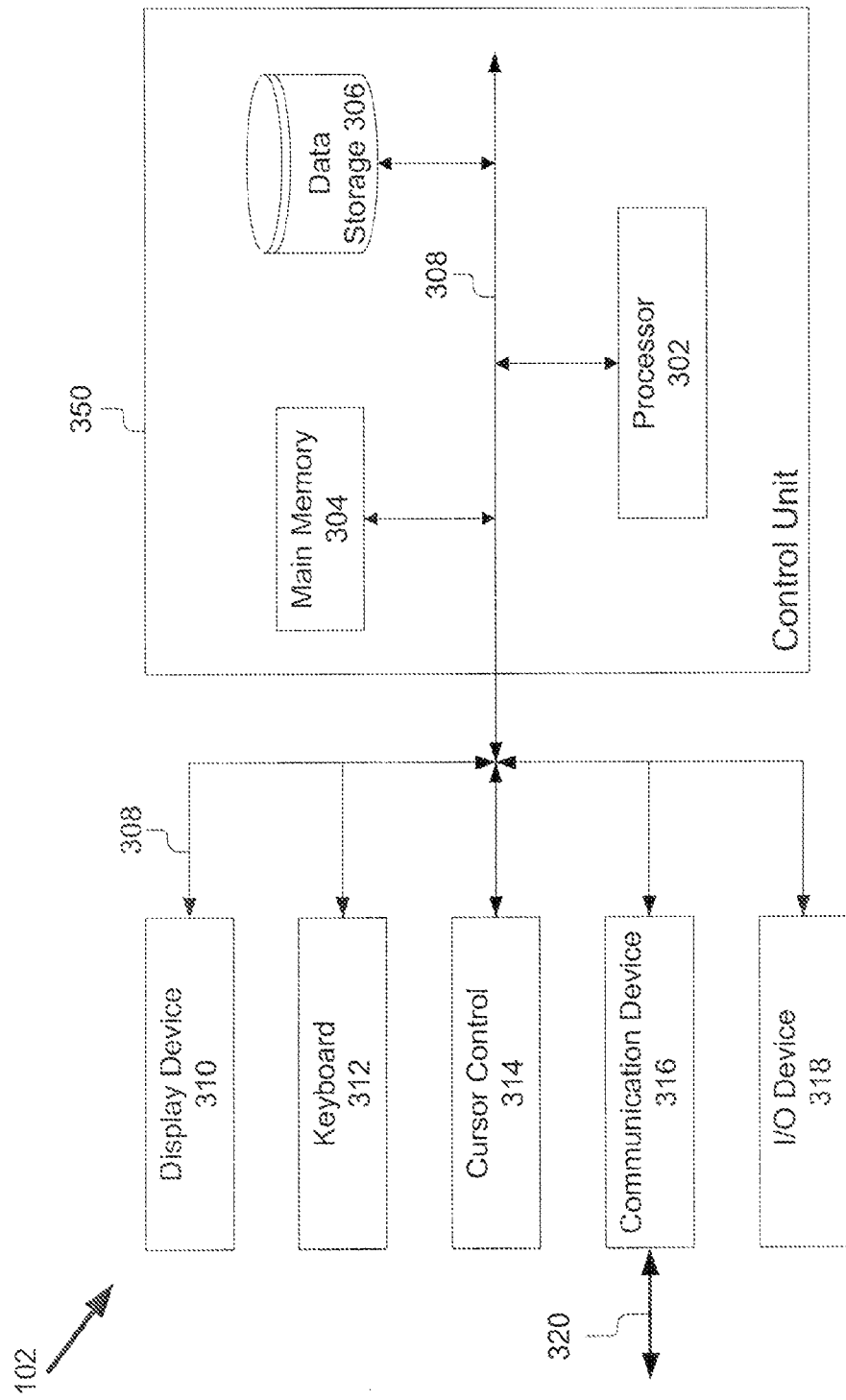
FIG. 3 is a block diagram of a system for operating the web analytics tool in accordance with the present invention.

Referring now also to FIG. 3, a functional block diagram of the first computing device 102 configured in accordance with embodiments of the present invention is shown. The first computing device 102 preferably comprises a control unit 350, the display device 310, a keyboard 312 and cursor control 314. The first computing device 102 may optionally include a communication device 316 and one or more input/output (I/O) devices 318.

The control unit 350 comprises an arithmetic logic unit, a microprocessor, a general purpose computer or some other information appliance equipped to provide electronic display signals to display device 310. In one embodiment, the control unit 350 comprises a general purpose computer having a graphical user interface, which may be generated by, for example, a program written in Java running on top of an operating system like WINDOWS® or UNIX® based operating systems.

Still referring to FIG. 3, the control unit 350 is shown including processor 302, main memory 304 and data storage device 306, all of which are communicatively coupled to system bus 308.

Processor 302 processes data signals and may comprise various computing architectures including a complex instruction set computer (CISC) architecture, a reduced instruction set computer (RISC) architecture, or an architecture implementing a one or more of instruction sets. Although only a single processor is shown in FIG. 3, multiple processors may be included.

Main memory 304 stores instructions and/or data that may be executed by processor 302. The instructions and/or data may comprise code for performing any and/or all of the techniques described herein. Main memory 304 may be a dynamic random access memory (DRAM) device, a static random access memory (SRAM) device, or some other memory device known in the art. The memory 304 is described in more detail below with reference to FIG. 4.

Data storage device 306 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the data storage device 306 includes web analytic statistics and data for presentation on the display device 310. In an another embodiment, the data storage device 306 is a disk array separate from the first computing device 102 but communicatively coupled for high speed access.

System bus 308 represents a shared bus for communicating information and data throughout control unit 350. System bus 308 may represent one or more buses including an industry standard architecture (ISA) bus, a peripheral component interconnect (PCI) bus, a universal serial bus (USB), or some other bus known in the art to provide similar functionality. Additional components coupled to control unit 350 through system bus 308 include the display device 310, the keyboard 312, the cursor control 314, the communication device 316 and the I/O device(s) 318.

The display device 310 represents any device equipped to display electronic images and data as described herein. In one embodiment, the display device 310 is a liquid crystal display (LCD) and light emitting diodes (LEDs) similar to those on many conventional display system for computers to provide a display area and status feedback, operation settings and other information to the user. In other embodiments, the display device 310 may be cathode ray tube type display.

Keyboard 312 represents an alphanumeric input device coupled to control unit 350 to communicate information and command selections to processor 302. The keyboard 312 can be a QWERTY keyboard, a key pad, or representations of such created on a touch screen.

Cursor control 314 represents a user input device equipped to communicate positional data as well as command selections to processor 302. Cursor control 314 may include a trackball, a stylus, a pen, a touch screen, cursor direction keys or other mechanisms to cause movement of a cursor. In one embodiment, Cursor control 314 is a digitizer in which a touch-sensitive, transparent panel covers the screen of display device 310.

The first computing device 102 may optionally include the communication devices 316 and one or more input/output (I/O) devices 318 such as described below.

The communication device 316 may be a network controller that links control unit 350 to a network (not shown) via signal line 320 that may include multiple processing systems. The network of processing systems may comprise a local area network (LAN), a wide area network (WAN) (e.g., the Internet), and/or any other interconnected data path across which multiple devices may communicate. The control unit 350 also has other conventional connections to other systems such as a network for distribution of files (media objects) using standard network protocols such as TCP/IP, http, https, and SMTP as will be understood to those skilled in the art. The communication device 316 in other embodiments includes a Bluetooth® transceivers, wireless transceivers, or infrared transceivers for communication along a channel 320.

One or more I/O devices 318 are coupled to the bus 308. These I/O devices 318 are part of first computing device 102 in one embodiment. The I/O device 318 may also include audio input/output device equipped to receive audio input via a microphone and transmit audio output via speakers. Optionally, I/O audio device 318 may contain one or more analog-to-digital or digital-to-analog converters, and/or one or more digital signal processors to facilitate audio processing. In one embodiment, I/O device 318 is a general purpose audio add-in/expansion card designed for use within a general purpose computer system.

It should be apparent to one skilled in the art that the first computing device 102 may include more or less components than those shown in FIG. 3 without departing from the spirit and scope of the present invention. For example, the first computing device 102 may include additional memory, such as, for example, a first or second level cache, or one or more application specific integrated circuits (ASICs). Similarly, additional components may be coupled to control unit 350 including, for example, an RFID tag reader, digital still or video cameras, or other devices that may or may not be equipped to capture and/or download electronic data to control unit 350. One or more components could also be eliminated.

Figure 4:
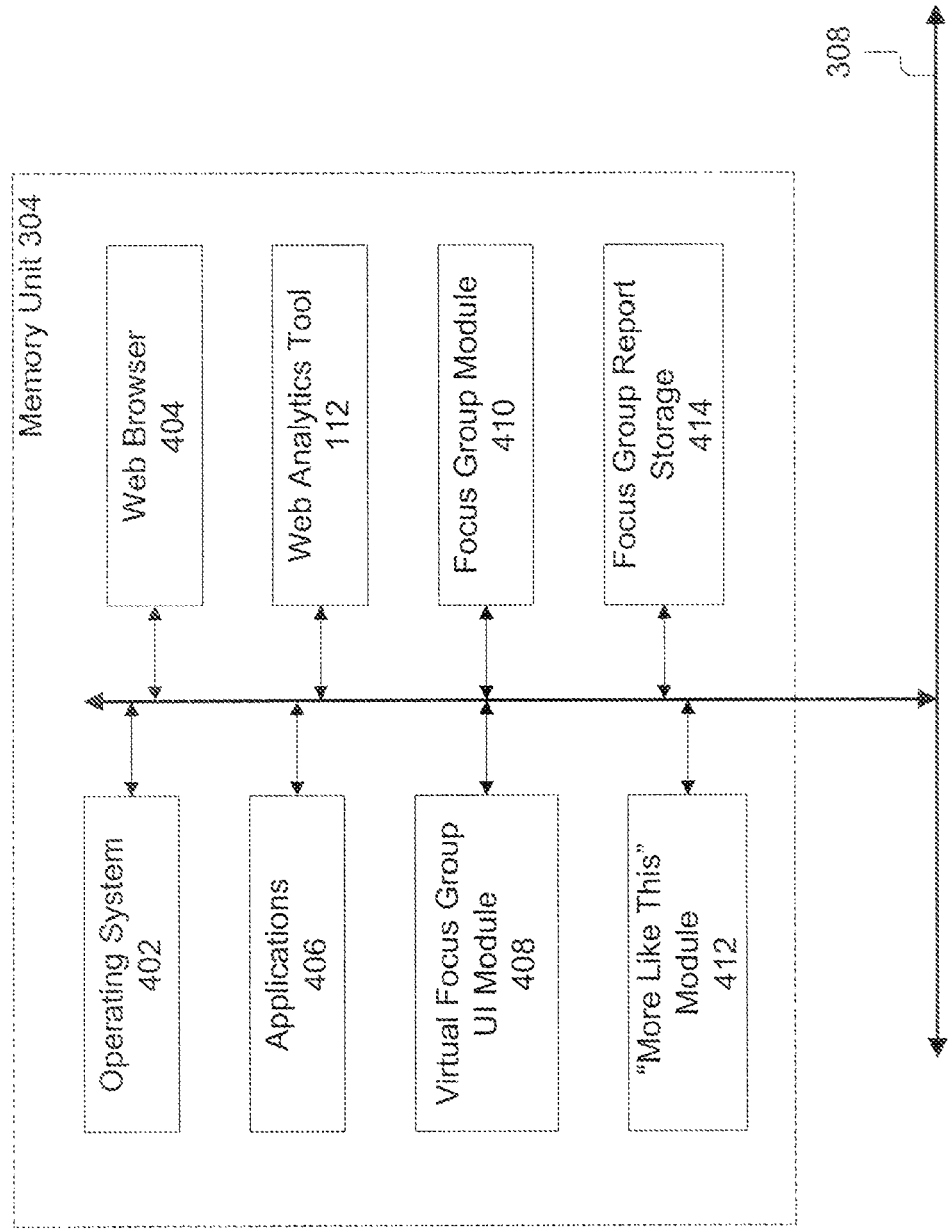
FIG. 4 is a block diagram of an embodiment of a memory for the web analytics tool of FIG. 3 in accordance with the present invention.

FIG. 4 is a block diagram of one embodiment of the memory unit 304 for the portable computing device 102. The memory unit 304 preferably comprises: an operating system 402, a web browser 404, one or more applications 406, a web analytics tool 112, the virtual focus group UI module 408, the focus group module 410, a "More Like This" module 412 and focus group report storage 414. Those skilled in the art will recognize that the memory 304 also includes buffers for temporarily storing data. The memory unit 304 stores instructions and/or data that may be executed by processor 302. The instructions and/or data comprise code for performing any and/or all of the techniques described herein. These modules 402-414 are coupled by bus 308 to the processor 302 for communication and cooperation. Those skilled in the art will recognized that while the present invention will now be described as modules or portions of a memory unit 304 of the first computing device 102, the modules or portions thereof may also be stored in other media such as permanent data storage device 306.

The operating system 402 is one of a conventional type such as WINDOWS®, SOLARIS® or a LINUX® based operating system.

The web browser 404 is of a conventional type that provides access to the Internet and processes HTML, XML or other mark up language to generated images on the display device 310. For example, the web browser 404 could be Mozilla Firefox or Microsoft Internet Explorer.

The memory unit 304 may also include one or more application programs 406 executed by control unit 350 including, without limitation, drawing applications, word processing applications, electronic mail applications, financial applications and web browser applications.

The memory 104 also includes a web analytics tool 112 such as Site Catalyst version 11 from Omniture of Orem, Utah.

The virtual focus group UI module 408 is a program or routines for generation of user interfaces for presentation of a simulation of a visitor's experience in navigating over various websites. Examples of interfaces produced by the virtual focus group UI module 408 are shown and described in more detail below with reference to FIGS. 7-15. The virtual focus group UI module 408 shows the web sites seen by a visitor during a visit in an interactive manner. The virtual focus group UI module 408 is coupled to the web analytics tool 112 and the focus group module 410 such as by bus 307 by way of example. The virtual focus group UI module 408 receives data from each of these modules 112 and 410, and creates the user interfaces that simulate the visit by a visitor. The virtual focus group UI module 408 presents a display to the user as if the user is looking of the shoulder of the visitor as the visitor navigates to different websites, or the user is an observer to a focus group of user navigating over different websites or pages on the internet The operation of the virtual focus group UI module 408 is described in more detail below with reference to FIGS. 5-6.

The focus group module 410 is a program or routines for collecting and processing information related to a particular visit to a web site. The focus group module 410 retrieves information such as: visitation paths, visitation times, websites visited, web pages displayed and other information about the user available from the web analytics tool 112. In particular, the focus group module 410 is able to select a particular visitor and retrieve information about a particular visit from the web analytics tool 112 and the data storage 306. The focus group module 410 determines which visitation path was followed and can show statistics associated with the visitation path. In one embodiment, the focus group module 410 includes routines to randomly select a visit from the web analytics tool 112 and the data storage 306, and retrieve the information related to that visit. In another embodiment, the focus group module 410 receives input from a user such as via the virtual focus group UI module 408. This input may be any criteria and is transformed into a segment definition to retrieve a visit and its associated information that match the segment definition. The focus group module 410 is particularly advantageous because is provides the ability to track down to the visitor level and extract that data for meaningful analysis. The focus group module 410 generates reports that show individual behavior based upon a precise segment of customers. These reports highlight the individual and how certain types of visitors are interacting with the website. This also gives a visit profile that can provide new insight into visit behavior. The focus group module 410 is also coupled to the focus group storage 414 to store reports therein. The focus group module 410 is coupled to the virtual focus group UI module 408 to display the report. The operation of the focus group module 410 is described in more detail below with reference to FIG. 5.

The "More Like This" module 412 is a program or routines for determining a visit that is being viewed by a user with the virtual focus group UI 408 and the criteria, characteristics or segments for the visit. The "More Like This" module 412 then determines other visits having the same criteria and presents one of the determine visits to the user. In one embodiment, the "More Like This" module 412 automatically determines other visits having the same criteria, selects one of those visits and presents the visit to the user in response to the single step by the user of selecting a "More Like This" button. In another embodiment, the user selects or inputs any number of criteria and then selects the "More Like This" button; and the "More Like This" module 412 determines other visits having the same criteria as those input by the user, selects one of those visits and presents the visit to the user in the virtual focus group user interface. When the "More Like This" module 412 is coupled for communication with the web analytics tool 112, the virtual focus group UI module 408 and the focus group module 410. In an alternate embodiment, the "More Like This" module 412 may send procedure calls to the focus group module 410 to perform the task of determining one or more visits that match input criteria. The functionality provided by this module 412 is particularly advantageous because in the context of the user interface of the present invention, the user is quickly able to find and review other visits that have the same criteria as the visit being viewed, and thereby look for trends, similar user interactions, or other factors to make the websites more effective.

The focus group report storage 414 is data storage for storing the reports generated by the focus group module 410. In one embodiment, the focus group report storage 414 is a portion of memory 304 at shown. An alternate embodiment, the focus group report storage 414 may be a portion of data storage 306.

Although not shown, the present invention may also include a control module. The control module is used to control the other modules 408, 410, 412, 414 of the memory unit 304 and their interaction with the web analytics tool 112. The control module is adapted for control of and communication with the virtual focus group UI module 408, the focus group module 410, the "More Like This" module 412 and the focus group report storage 414. The operation of the control module 304 will be apparent from the description of FIGS. 5 and 6 below. Those skilled in the art will recognize that the control module in another embodiment may be distributed as routines in the other modules 408, 410, 412, 414.

Methods

Figure 5:
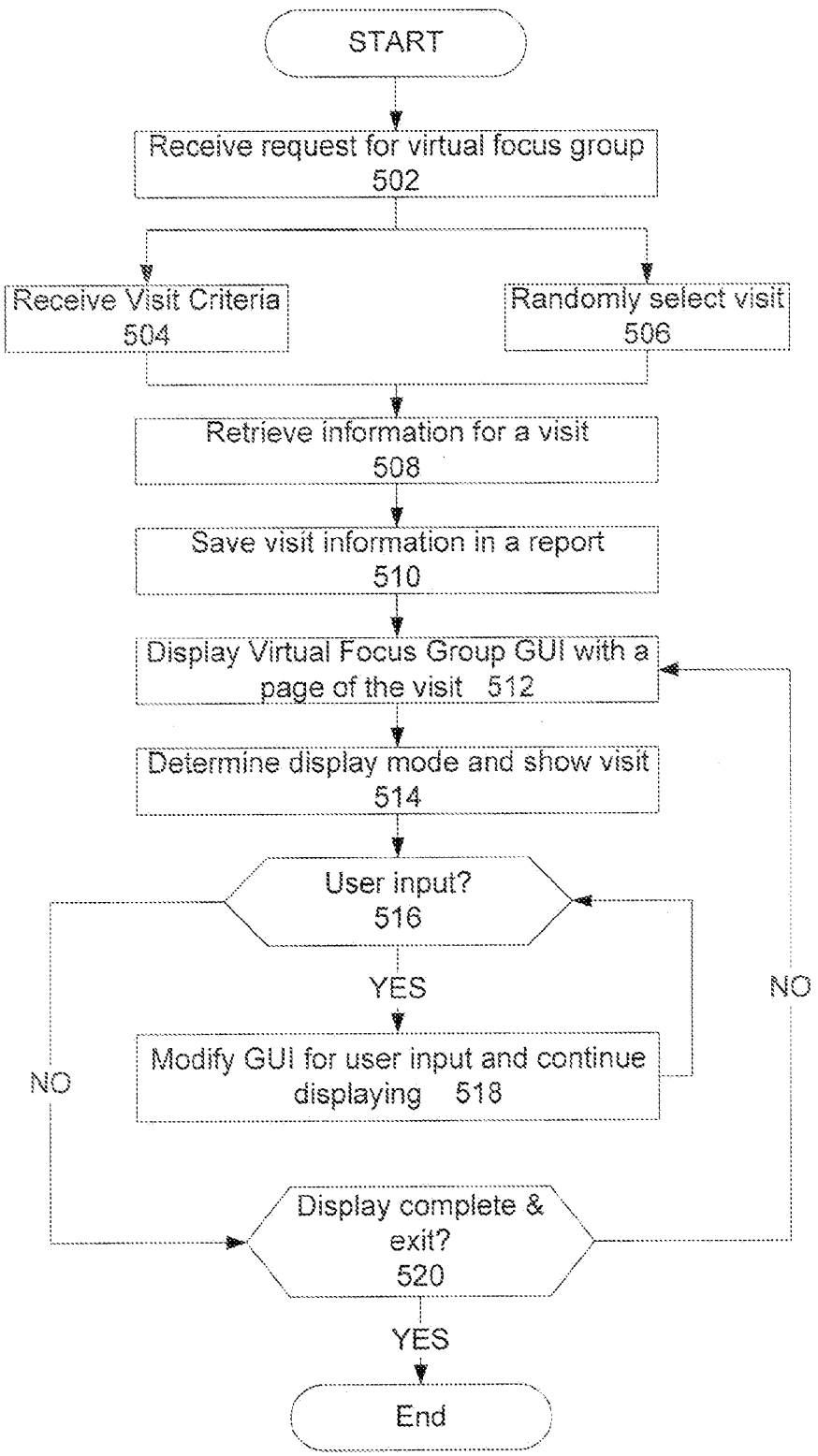
FIG. 5 is a flow chart of an embodiment of a process for retrieving information regarding a visit and presenting a simulation of the visit in accordance with the present invention.

Referring now to FIG. 5, one embodiment of a preferred process for presenting a simulation of a visitor interaction with a plurality of websites is shown. The process begins by receiving 502 a request for a virtual focus group from a user. Depending on the request and the defaults that have been set by the user, the method proceeds to: 1) receive 504 visit criteria for the simulation, 2) randomly select 506 a visit and its corresponding criteria, or 3) both. In one embodiment, the user can input the criteria or segments that he is interested in stimulating. Using the input criteria, the system selects a visit having matching criteria to those input by the user. Since they given criteria may yield a plurality of visits, this step may be followed by a step of randomly selecting one of the plurality for display to the user. In another embodiment, the method randomly 506 selects a visit from the user's available data without any input criteria from the user. Next, the method retrieves information for the visit identified in either step 504 or step 506. The visit information is then saved 510 in a report. In one embodiment, the retrieved information includes: representations of the web pages that were seen by the user during the visit, a length of time the user viewed each web page, an order in which the web pages were viewed, segments related to each web page, and a variety of other web analytics data associated with the visit.

Next, the method displays 512 the virtual focus group graphic user interface (GUI) with a first page of the visit that was retrieved in step 508. When the method successively returns to this display step 512, other pages are shown in sequence. The user may also select a particular page for display, and in such an instance, display step 512 displays that page. The virtual focus group GUI is described below in more detail with reference to FIGS. 7-15. The method then determines 514 a display mode and shows the visit in that mode. In one embodiment, the visit is shown as a slideshow with representations of each web page that were visited during the visit shown for an amount of time proportional to the time in which the user reviewed that web page. In another embodiment, each of the web pages that were visited during the visit is shown in the user interface as a slide deck. The user may then select any individual web page for display, or the user may mouse-click forward from page to page spending as much time as desired showing the representation of each web page the visitor traversed.

In one embodiment, during the time the web pages are displayed (steps 512 and 514); the user may input any number of control signals or commands. Next, the method determines 516 whether the user input any commands or signals. If the user has provided input, the method modifies 518 the GUI based upon the user input and continues the step of displaying the updated GUI. For example, there are a number of input commands which the user may input. One such command is to pause of the display. Another command is to modify the speed at which the web pages are presented. Another command is to move forward or backward one or more web pages. Various different input commands will be described in more detail with reference to FIGS. 7-15. Once the display has been modified and updated, the process returns to step 516 to determine whether any additional user input has been received from the user.

If the user has not provided any input or a predetermined amount of time has elapsed, the method proceeds to step 520. In step 520, the method determines whether the display of the visit is complete and the user has input the command to exit. If so the method is complete and ends. If not, the method returns to step 512 to display the virtual focus group GUI with the first page of the visit.

Figure 6:
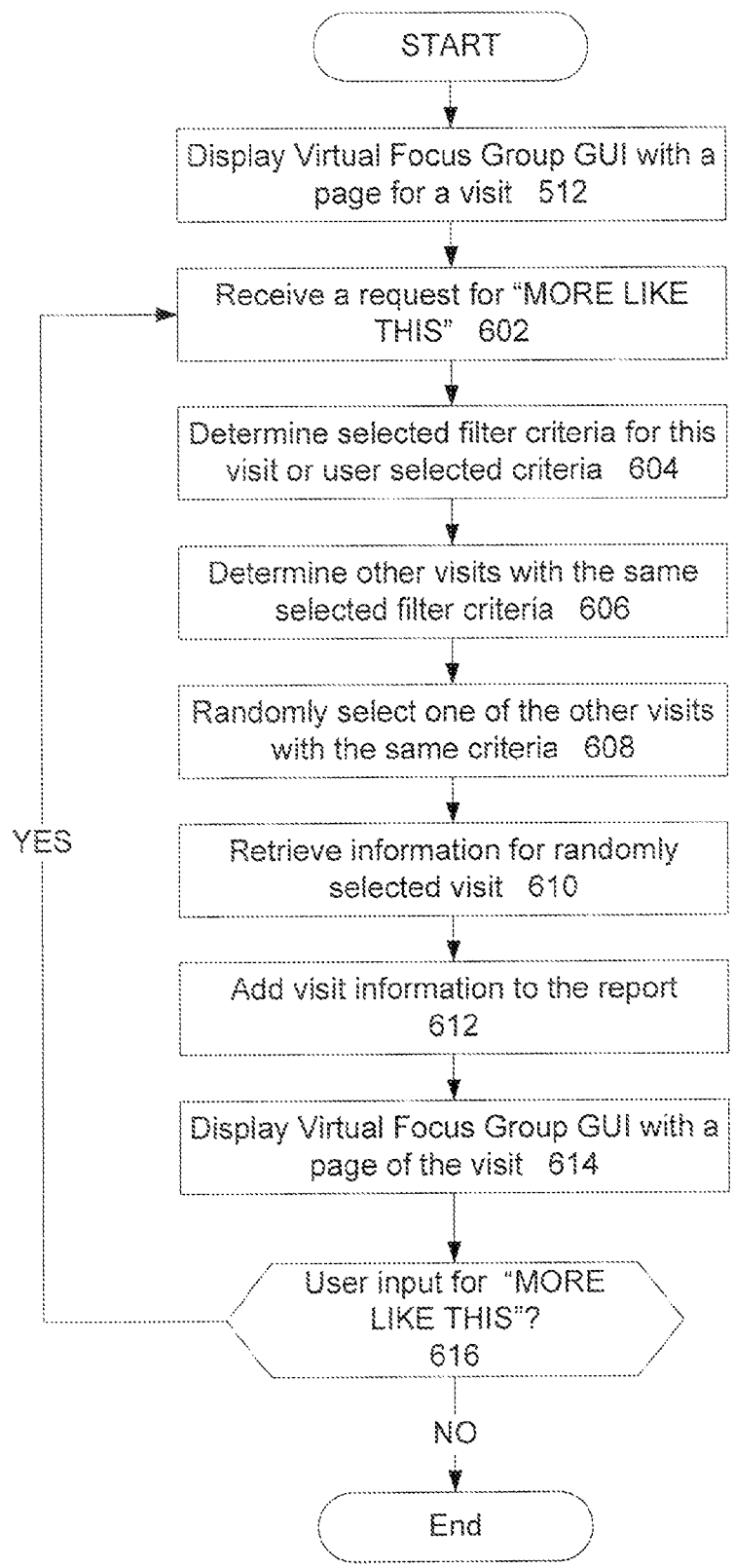
FIG. 6 is a flowchart of an embodiment of a process for retrieving information about a visit having similar segmentation attributes and presenting a simulation of the visit in accordance with the present invention.

Referring now to FIG. 6, an embodiment of a process for automatically showing simulations of visits to web pages that have similar characteristics to a visit being reviewed with the virtual focus group GUI is shown in more detail. The process begins by displaying 512 a virtual focus group GUI with a page for a visit. Next the system receives 602 a request for "More Like This" signal. Then the process determines 604 the selected filter criteria for this visit. In an alternate embodiment, the method of the present invention uses user selected criteria that have been input. During steps 604, the input user criteria would be determined. The method then determines 606 other visits with the same criteria as those that have been selected. In one embodiment, method determines matching visits from all data sets accessible by the user. In another embodiment, the method uses a default pool or set of visits for the comparison. In yet another embodiment, the method uses a pool or set of visits predefined by the user.

Next, the method randomly selects 608 one of the other visits that has the same criteria or segments as determined in step 604. The method then retrieves 610 information for the randomly selected visit. This is step is similar to step 508 described above with reference to the method of FIG. 5. The visit information that was retrieved is added 612 to the virtual focus group report. An example interface for showing multiple visits in the single report is shown below with reference to FIG. 14. In one embodiment, the virtual focus group report is temporarily stored in buffers in memory 304. In an alternate embodiment, once the visit information has been added to the virtual focus group report, and it is stored in nonvolatile storage. Next the method displays 614 the virtual focus group GUI with a first page of the visit. Those skilled in the art will recognize that this display step 616 also includes display updating and receiving of user input similar to steps 514, 516, 518 described above with reference to FIG. 5. During this step, the user has the ability to manipulate and review this second visit that has related attributes. Once the user has completed his review and interaction with the simulation of the related visit, the method determines 616 whether the user has input an additional request for "More Like This". If so the method returns to step 602 and repeats the process. If not the method is complete and ends. Those skilled in the art will recognize how the functionality provided by this method allows the user to review a variety of website visits having the same criteria to see how the user interacted with different web pages. This allows the user to quickly and easily determine whether a particular areas or particular web pages are difficult for the user to navigate, are well-designed and lead to conversion and purchase a product, or other information about the user experience. The ability to quickly secure and locate related visits having the same or matching segments is particularly advantageous for these purposes.

Graphical User Interface

Referring now to FIGS. 7-15, example virtual focus group GUIs in accordance with an embodiment of the present invention are shown. FIG. 7-15 show the GUI in different stages of interacting with the user. The virtual focus group GUI is particularly advantageous because it provides an interface that presents to the user a similar experience to the visitor that traversed the web pages comprising the visit.

Figure 7:
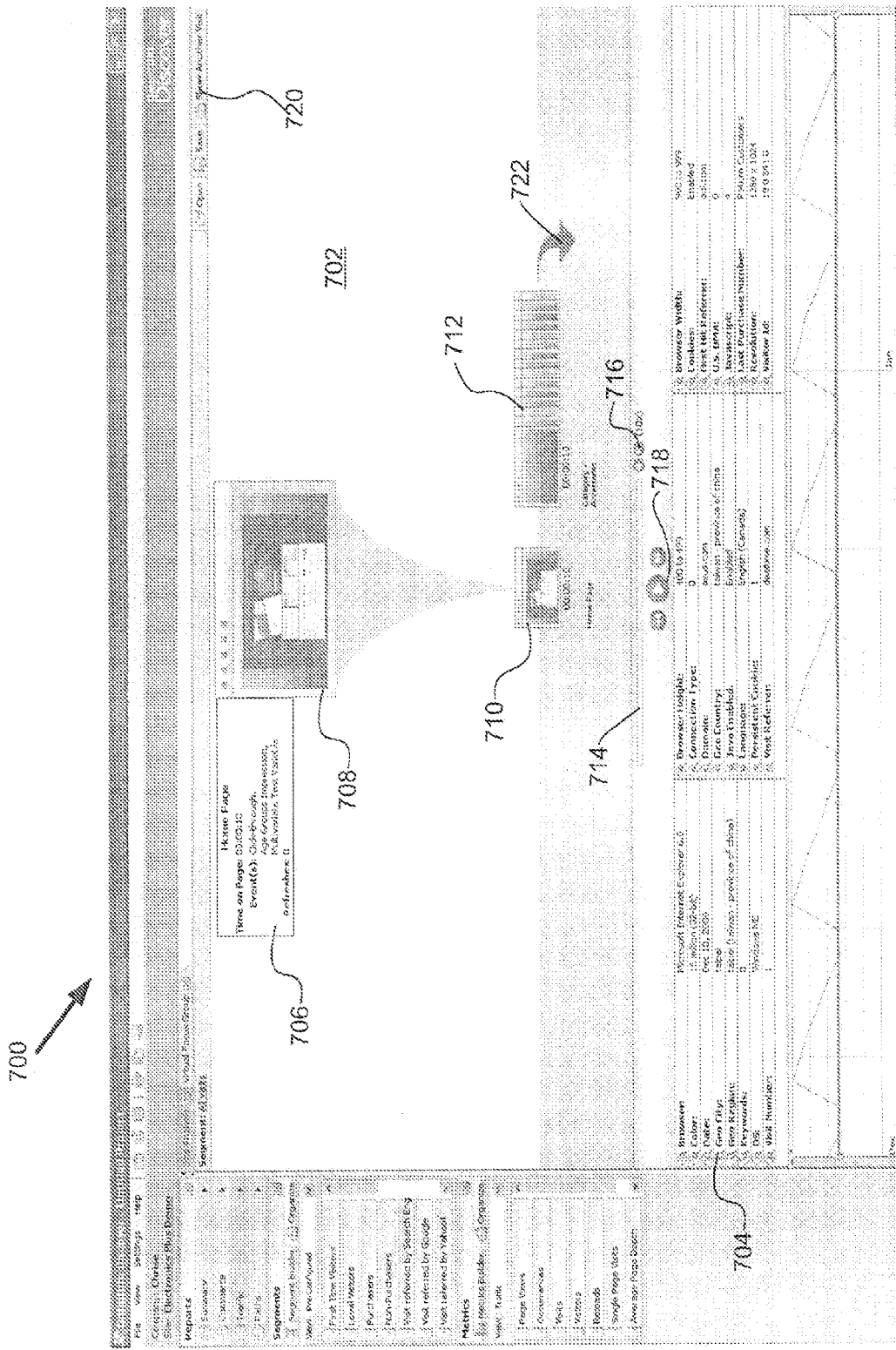
FIGS. 7-12 are exemplary graphical user interfaces provided by the web analytics tool in accordance with the present invention.

FIG. 7 is a graphical representation of a window 700 showing the virtual focus group GUI of the present invention. FIG. 7 illustrates one example of the virtual focus group GUI. As can be seen in FIG. 7, the virtual focus group GUI includes a section 704 showing segments of selection, a section showing path visibility 712, and a section showing visit profile information 702. Still more particularly, FIG. 7 illustrates the virtual focus group GUI after a random visit has been selected by the focus group module 410 and presenting the first page of the visit. The user can use this interface to show the visit page by page. In the upper portion 702 of the user interface, a representation 708 is shown. In one embodiment, the primary representation 708 is a version of the web page slightly reduced in size so that the user sees significant detail and an image very similar to that which the visitor saw during their visit. Adjacent to the representation 708, an information box 706 provides more information about the web page such as the name of the web page, the time the visitor spent on the web page, the events that occurred on the web page, the number of refreshes of the web page that the visitor performed, etc. Below the primary representation 708 of the web page, the virtual focus group GUI presents a thumbnail image 710 of the web page. This thumbnail image 710 is used as an indication as to the location of this web page in the visit. In one embodiment, the virtual focus group GUI presents additional information about the web page corresponding to the thumbnail image 710 just below the thumbnail image 710. Since FIG. 7 shows the first page of the visit, subsequent pages are shown by an icon 712 to the left of the thumbnail image 710. In one embodiment, the icon 712 appears as a stack of slides or web pages. The number of slides shown by the icon is representative of the number of web pages that are included in the visit. For example is shown in FIG. 7, approximately 15 slides are shown as part of icon 712.

Continuing to refer to FIG. 7, the virtual focus group GUI provides a number of input buttons or command bars to interact with the simulation of the visit. In particular, virtual focus group GUI includes a slider bar 714, buttons 716 for controlling the display rate of the visit, video display control buttons 718, an exit button 722, and a show another visit button 720 in addition to other conventional menus, toolbars, interface control mechanisms provided by the web analytics tool 112.

The slider bar 714 allows the user to control the virtual focus group GUI to display a particular web page. The slider bar 714 also provides another indication as to the amount of the visit that has been displayed. Since in this instance the first slide or web page is being displayed, the slider bar 714 is blank and shows no portion of the visit to have been simulated. When the mouse or cursor controller 314 is positioned over the slider bar 714, additional feedback is provided that allows the user to set the playback to a position at any time/web page during the visit.

The buttons 716 for controlling display rate of the visit allow the user to the increase or decrease the display rate. The virtual focus group GUI also provides parenthetical feedback adjacent to the button 716 to indicate the rate at which the visit is being displayed. The display rate is the rate at which the web pages comprising the visit are display by the virtual focus group GUI. Since the present invention simulates the experience of the visitor, each of the web pages is presented in the virtual focus group GUI for an amount of time that is proportional to the time the visitor spent on the web page. The buttons 716 allow the user to select that proportion or percentage. For example, a speed control that uses 1×, 2×, 5×, 10×, 20×, 100×, etc. may be used.

The video display control buttons 718 allow the user to play, pause, forward or rewind the simulation. In one embodiment, the center button toggles between play and pause. It should be understood by those skilled in the art that the simulation presented by the GUI of the present invention has a format and appearance that is like the display of video. In one embodiment, the simulation is an interactive and graphically smooth player of the visit the report.

The "start over" or exit button 722 indicates that the user has completed using the present invention to simulate the visit and selection of the exit button 722 in this the simulation and display of this report. In one embodiment, the "start over" button 722 erases the visits and segments from the report and starts the report with a "clean palette".

The show another visit button 720 causes the present invention to retrieve another visit with the same criteria. The process for selecting another visit with related criteria has been described above with reference to FIG. 6. The selection of the show another visit button 720 initiates this process.

As was noted above, the virtual focus group GUI includes a section 704 proximate the bottom of the display to show information about this visit including the different segments related to particular visit or webpage. The section 704 includes a profile of the visit. Several tabs are provided such as a tab for summary, products, referrers and campaigns. For example, the summary tab would include the information as show such as customer ID, visit number, date visited, visit length (Number of pages viewed), time spent on site (Time duration), days since last visit, entry page, search engine, search term, products purchased, orders, visit value ($ based number). The different segments shown in section 704 also selectable by the user. Upon selection, the virtual focus group GUI shows the selected segments individually distinct manner such as with highlighting. Each item in the summary will have the ability to use the value to create additional segment criteria. Upon selecting the icon next to the object, it will prompt the user to use exact, greater than or less than value to create the segment. Upon selecting the rule, the segment creation pop up will appear and ask for the user to rename the segment. The products tab is a list of the products purchased during visit. The referrers tab lists of all referrers for the visit. The campaigns tab is a list of all campaign values captured for the visit.

Although not shown, those skilled in the art will recognize that the virtual focus group GUI provides a variety of statistics on hover. In other words, various statistics such as, page views, visits, visitors, etc. can be shown at a variety of different locations over the virtual focus group GUI.

Figure 8:
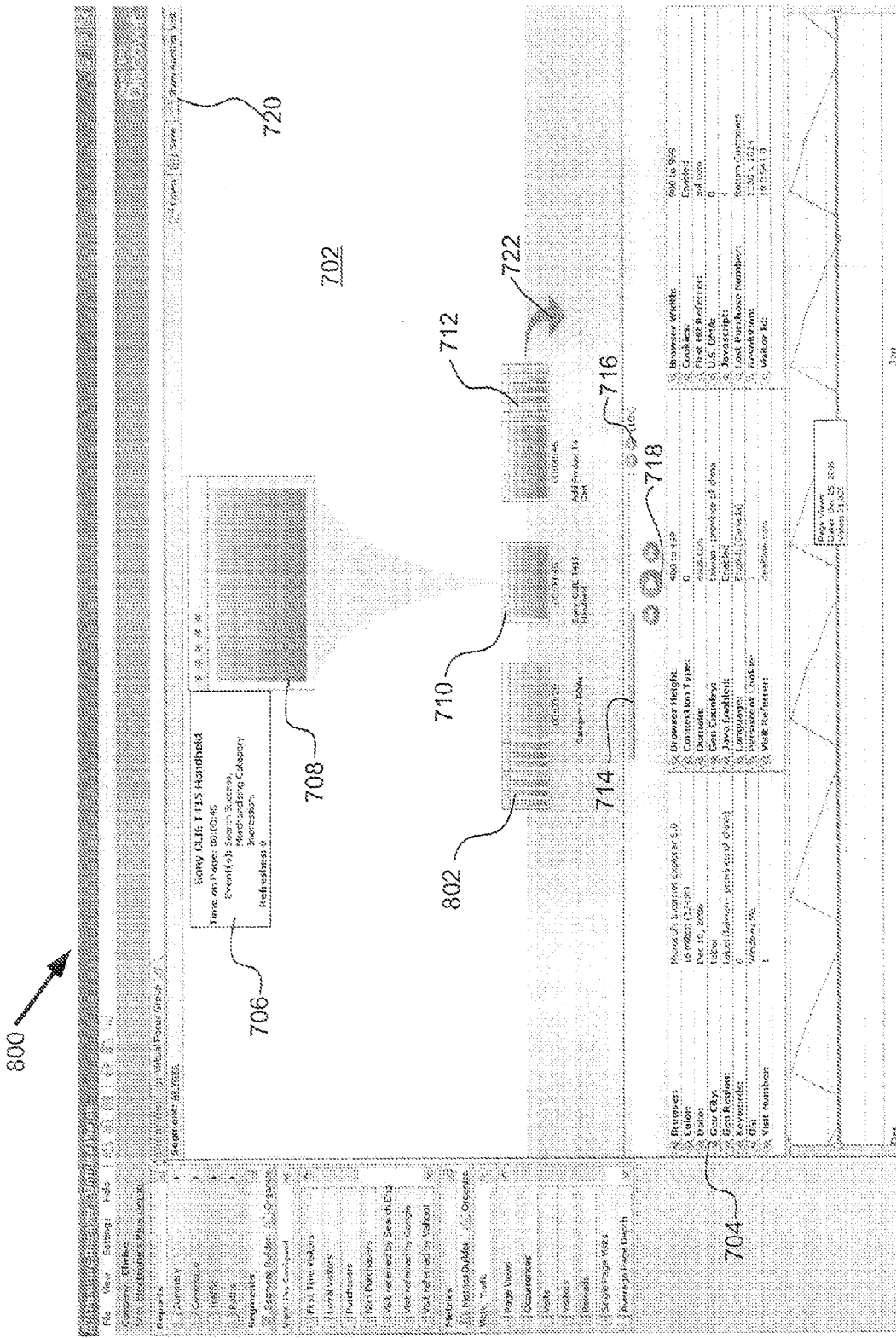

FIG. 8 shows the same visit as shown in FIG. 7 but at a different time. FIG. 8 shows the virtual focus group GUI 800 halfway through the process of simulating the visit. By comparing the differences between FIG. 7 and FIG. 8, the functionality of the virtual focus group GUI can be better understood. As shown in FIG. 8, the GUI now includes an icon 802 that represents the slides or web pages that have already been simulated. In one embodiment, the icon 802 has the same display attributes as icon 712 but merely represents the web pages that have already been shown on the GUI. Similarly, the slider bar 714 is now shown about half completed indicating the progress of the simulation.

Figure 9:
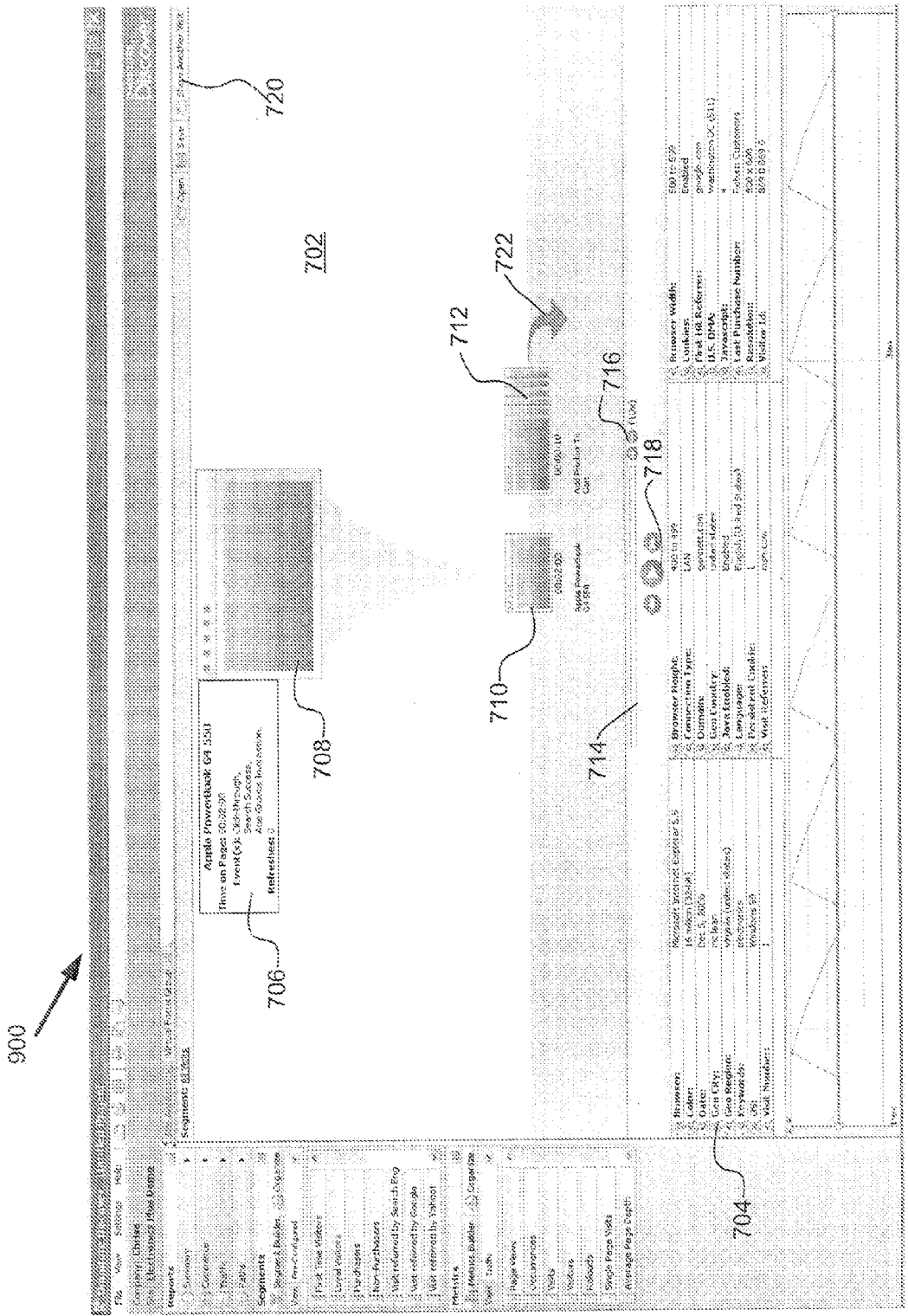
Figure 10:
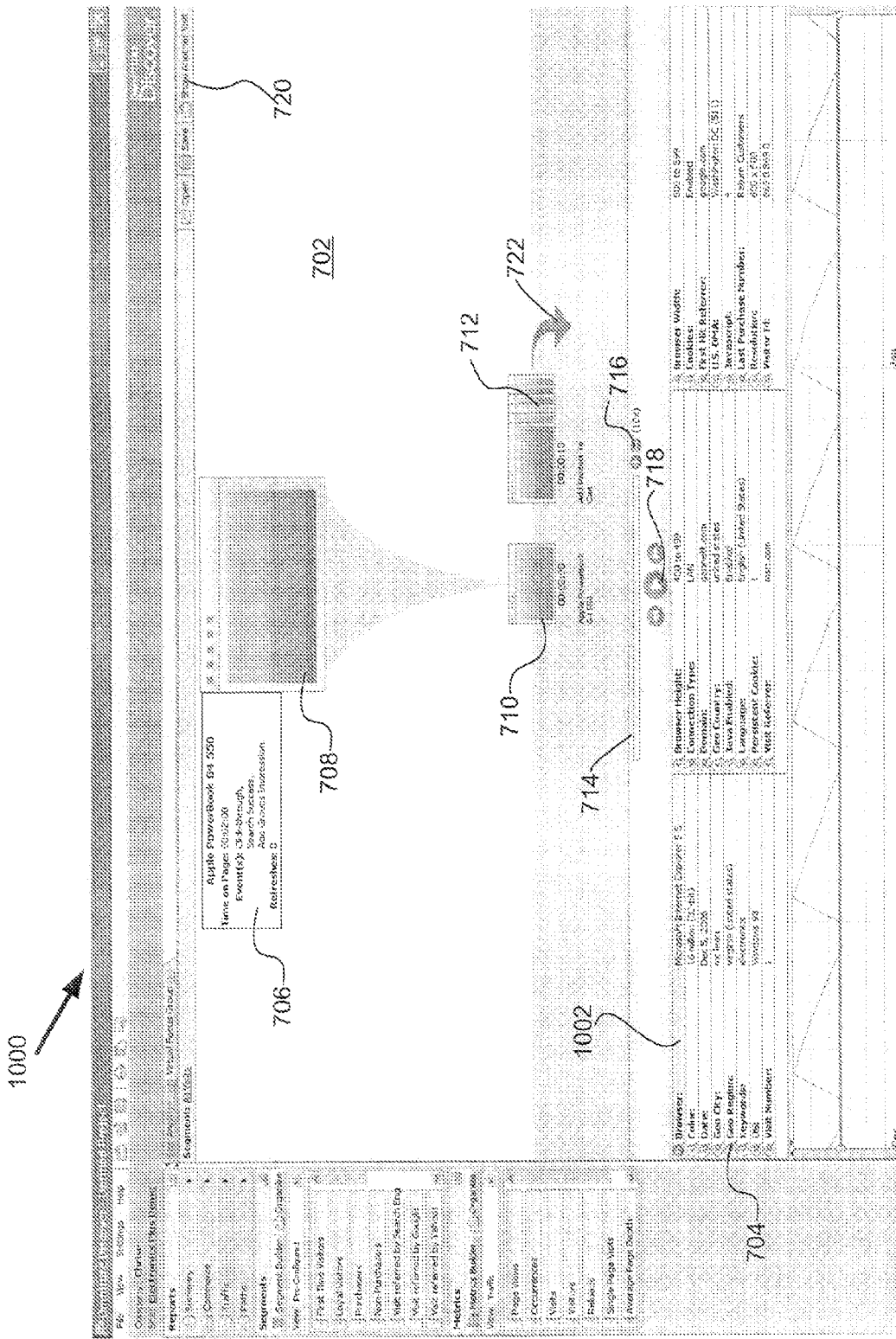
Figure 11:
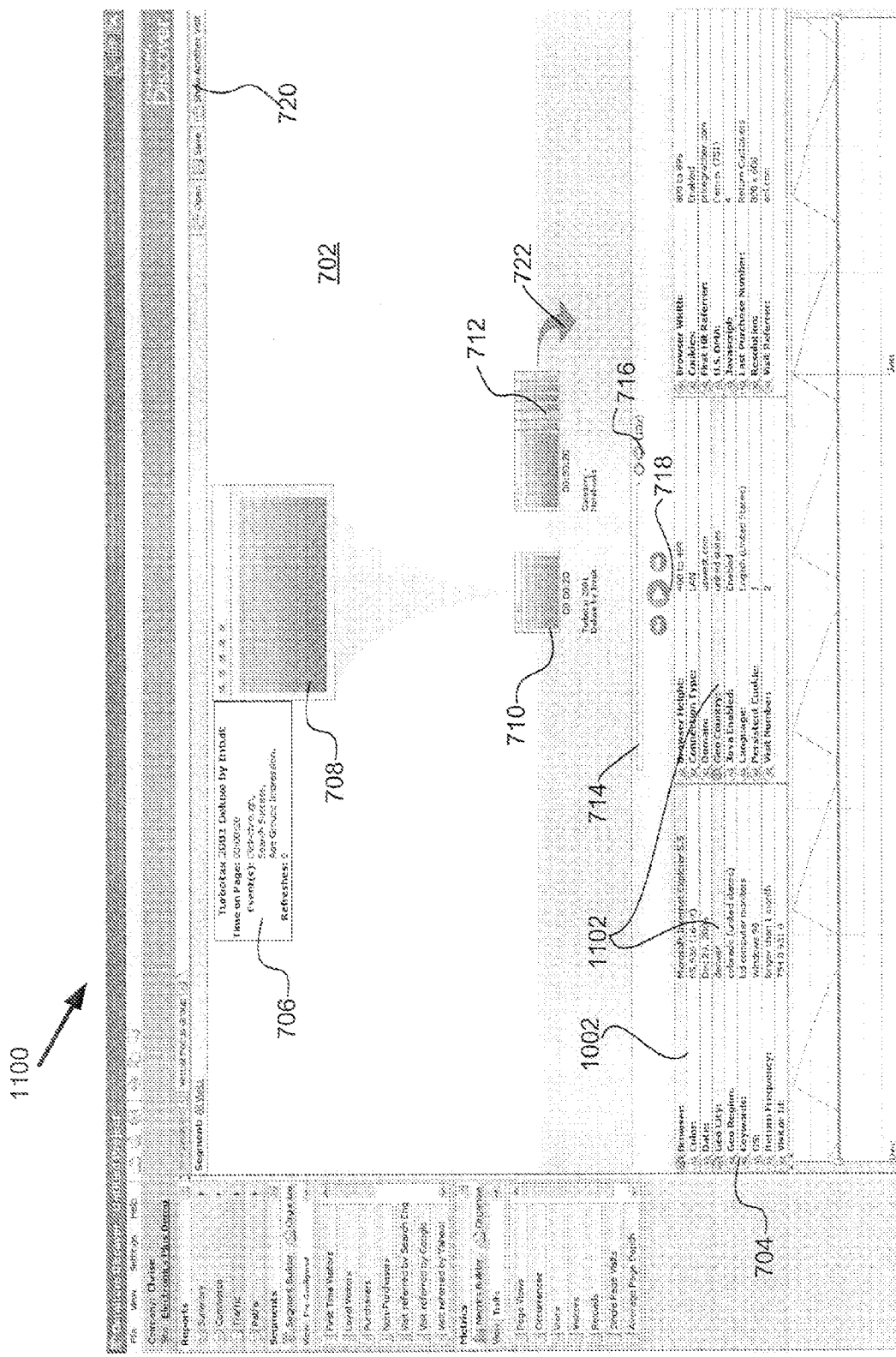
Figure 12:
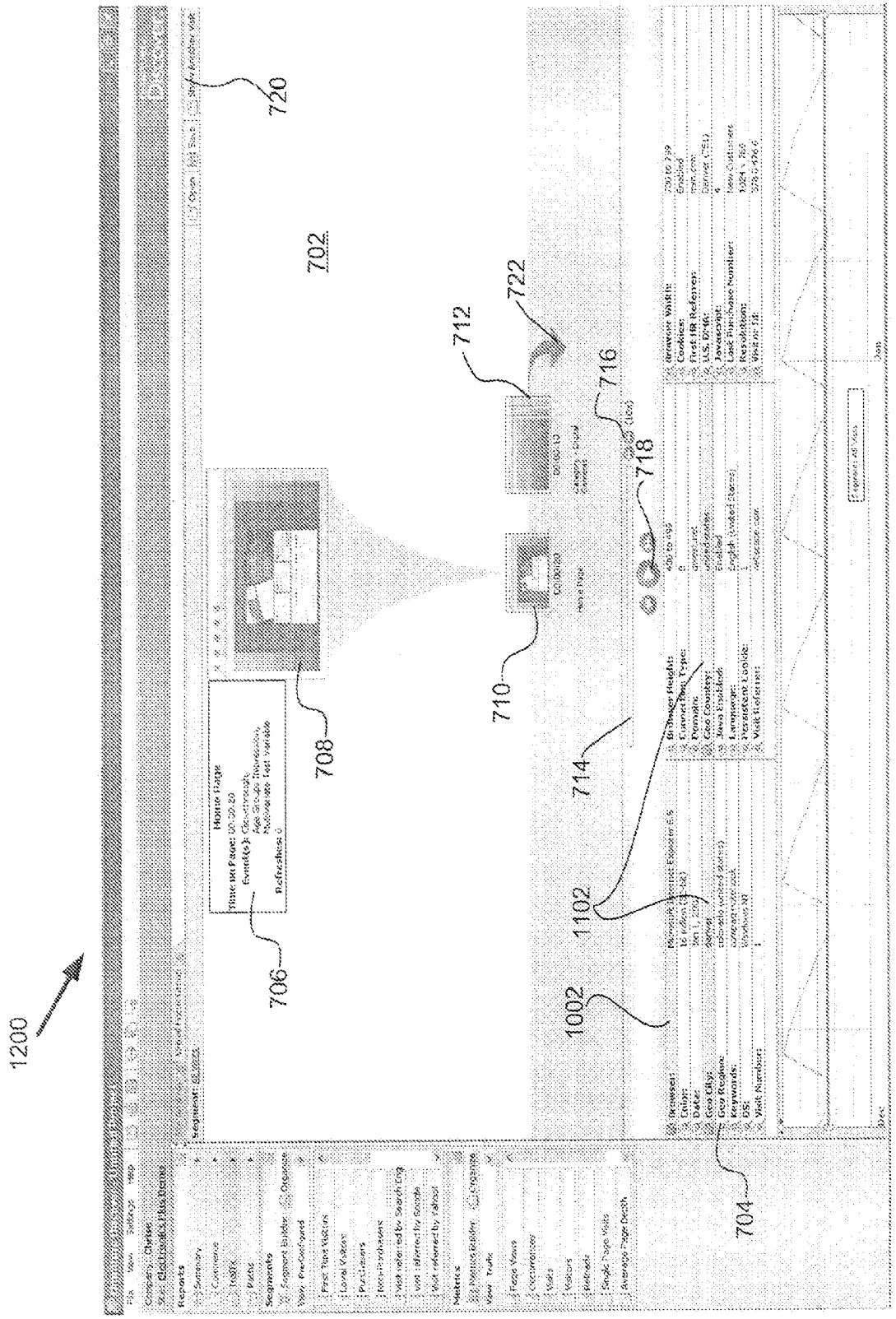

FIG. 9 shows the virtual focus group GUI 900 with another visit. FIG. 9 illustrates the first page of the visit and the visit has already been simulated and the simulation has been completed, or this visit has not been simulated at all. Clicking the "show another visit" button 720 randomly selects a new visit using the selected filter criteria. FIG. 10 shows the virtual focus group GUI 1000 with the same visit as that shown in FIG. 9. However, at this point the user has selected "browser" 1002 from the lower table selection 704. In response, the present invention shows the "browser" 1002 in have usually distinct formats such as shaded. This means that all future selected visits using button 720 will match the same criteria. For example, all future visits displayed by the virtual focus group GUI in response to the selection of button 720 will also be from users that use Microsoft Internet Explorer 5.5 as their browser. Referring now also to FIG. 11, the virtual focus group GUI 1100 is shown with the same visit as that shown in FIGS. 9 and 10. However, at this point the user has selected "city" and "country" 1102 in addition to "browser" 1002. These portions 1002, 1102 of the lower selection table 704 have visually distinct formats such as shading. Now the user has selected three criteria browser, city and country. In response, the focus group module 410 randomly selects new visits the mass the same criteria. Those skilled in the art will recognize that the user can use the virtual focus group do we in effect to build a segment in reverse by looking at a single visitor and repeatedly selecting the "show another visit" button 720 with different criteria. The user can select any of the segments shown in the lower table portion 704 to build a particular segment. This is particularly advantageous because it allows the user to create new segments for analyzing the web analytics data iteratively while watching these simulations provided by the virtual focus group GUI. Referring now also to FIG. 12, a representation of the virtual focus group GUI 1200 after the user has selected the "show another visit" button 720 with the state of simulation shown in FIG. 11. FIG. 12 shows the results after selecting button 720. Specifically, FIG. 12 shows a new visit matching all the previously selected criteria.

Figure 13:
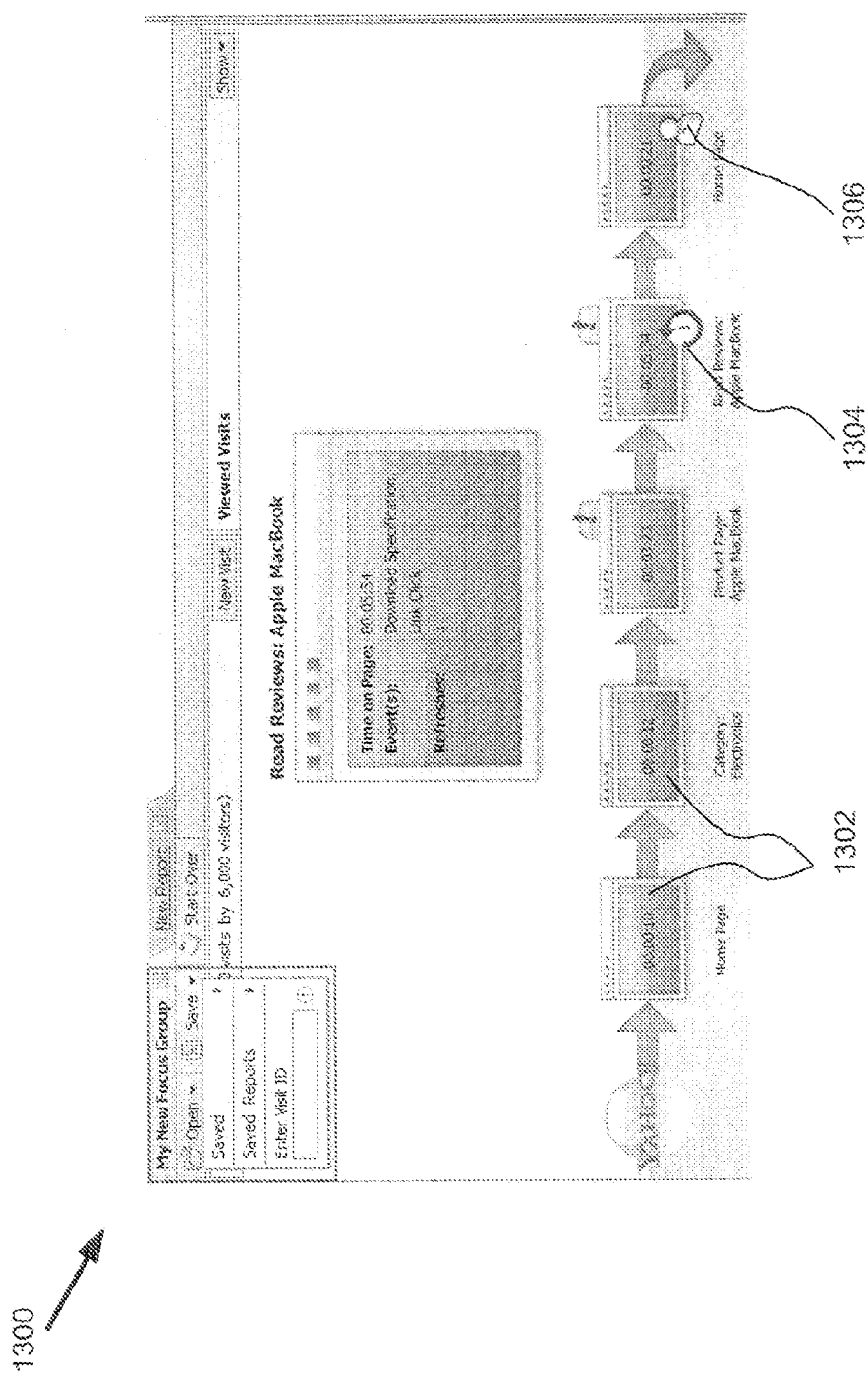
FIG. 13 is another embodiment of a graphical user interface provided by the web analytics tool for simulating a visit in accordance with the present invention.

Referring now to FIG. 13, another embodiment for the virtual focus group GUI is shown. In particular, in the upper left portion of the GUI, an example pull down menu illustrates how a visit can be saved as a report or given an identification number. This alternate embodiment also shows the visit as a series of icons 1302 each representing a different web page in the visit. This alternate embodiment also provides visual feedback about particular web pages in the visit. For example, the fourth icon representing a web page is shown with an icon 1304 indicating the number of times the web page was refreshed. Similarly, the fifth icon representing another web page is shown with an icon 1306 indicating that the web page has been previously viewed. Similarly, an exclamation point above a particular icon 1304 indicates that an event occurred when the visitor was on that web page.

Figure 14:
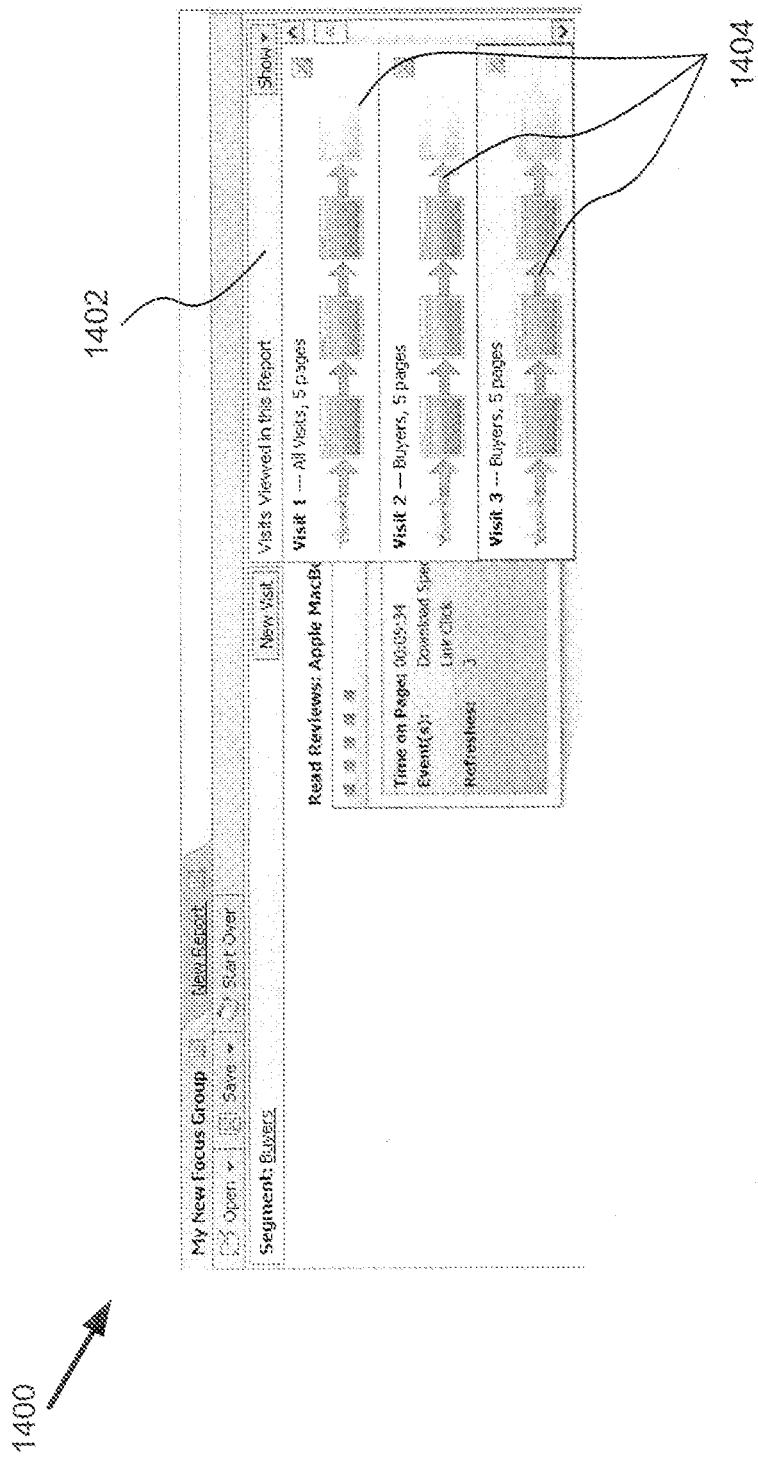
FIG. 14 is an embodiment of a graphical user interface provided by web analytics tool showing multiple visits included within the report.

Referring now to FIG. 14, another embodiment of the virtual focus group GUI 1400 is shown. FIG. 14 is used to illustrate additional information provided by the GUI 1400. The GUI 1400 may also include a "Visits Viewed In This Report" tab that causes the GUI 1400 to display a list of all the visits viewed in this report. In the embodiment shown in FIG. 14, the list of the viewed visits will be shown vertically as a list with each visit represented in a box 1404. Each of the boxes 1404 includes information such as a visit number or visit ID, a segment, the number of pages in the visit represented, representative icons, and other information.

Figure 15:
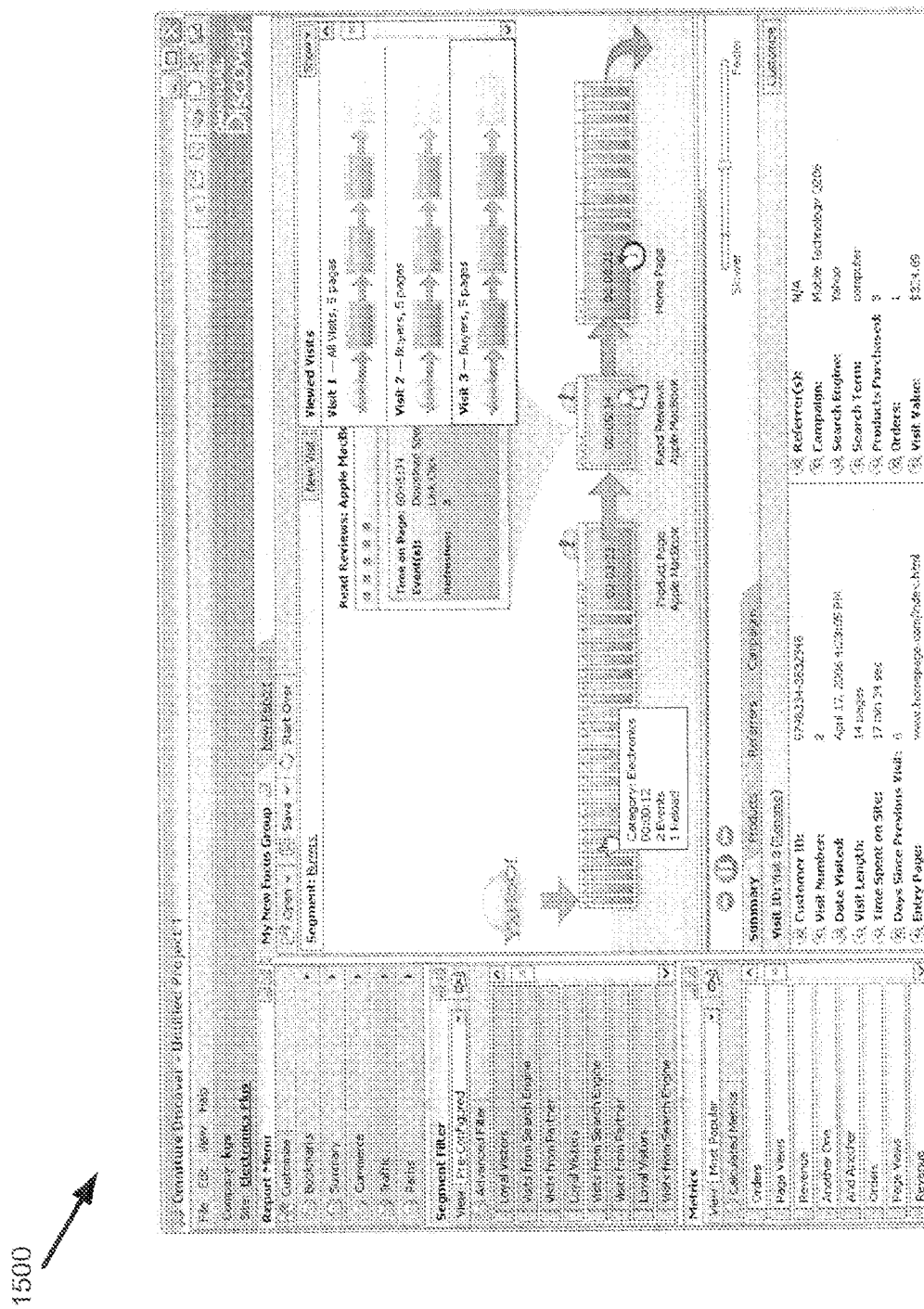
FIG. 15 is another exemplary embodiment of graphical user interface provided by the web analytics tool for simulating a visit showing various display attributes of the interface in accordance with the present invention.

Referring now to FIG. 15, a virtual focus group GUI 1500 that includes a number of the features described above separately is shown. In particular as shown in FIG. 15, the three cards representing different web pages each has a time clock representing that indicates how long the visitor viewed each page. FIG. 15 also illustrates additional information provided by the virtual focus group GUI upon mouse over. What I mouse over occurs above a card in the slide deck, the information for that web page is displayed in a mouse over window. This is similar to the statistics on hover feature described above.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Accordingly, the disclosure of the present invention is intended to be illustrative, but not limiting, of the scope of the present invention, which is set forth in the following claims.

The invention claimed is:

1. A method for simulating a previously captured interaction with content pages by a visitor, the method comprising:
    retrieving, from a data storage, information about a previous visit to a network site by the visitor, the information including a plurality of content pages previously accessed by the visitor during the previous visit;
    displaying, on a display device, the retrieved information as a simulation in a virtual focus group user interface, the displayed simulation comprising:
        a first portion displaying a primary representation of one of the plurality of content pages; and
        a second portion displaying a representation of the plurality of content pages previously accessed by the visitor during the previous visit visually arranged in sequence according to an order in which the plurality of content pages were accessed by the visitor during the previous visit and providing a visual indication of a position of the content page displayed in the first portion relative to the plurality of content pages visually arranged in sequence, wherein the second portion displayed comprises:
            a first slide deck icon comprising a first stack of slides representative of one or more of the plurality of content pages that were accessed by the visitor during a first portion of the previous visit that occurred prior to accessing the content page displayed in the first portion, wherein the number of slides in the first stack of the first slide deck corresponds to a number of the one or more of the plurality of content pages accessed during the first portion of the visit; and a second slide deck icon comprising a second stack of slides representative of one or more of the plurality of content pages that were accessed by the visitor during a second portion of the previous visit that occurred subsequent to accessing the content page displayed in the first portion, wherein the number of slides in the second stack of the second slide deck corresponds to a number of the one or more of the plurality of content pages accessed during the second portion of the visit;

receiving, from a computing device, input related to the simulation; and changing the displaying on the display device based on the received input.

2. The method of claim 1, wherein the step of retrieving information comprises randomly selecting a visit from a plurality of visits stored in the data storage.

3. The method of claim 1, further comprising;
receiving a visit criterion for simulation from a user;
determining one or more matching visits that have criterion that match the received visit criterion; and
wherein the step of retrieving information comprises selecting the previous visit from the determined one or more matching visits.

4. The method of claim 1, further comprising storing the retrieved information in a report.

5. The method of claim 1, wherein the information includes:
a representation of each content page as viewed by the visitor during the previous visit;
a length of time the visitor viewed each content page during the previous visit;
an order in which the content pages were viewed during the previous visit; and
at least one segment related to one of the content pages viewed during the previous visit.

6. The method of claim 1, wherein the simulation has a format and appearance of video in which the display is automatically transitioned to display each content page from the plurality of content pages for an amount of time approximately proportional to a time that the content page was viewed during the previous visit.

7. The method of claim 6, wherein the input comprises a modification to a display rate of the primary representation by the user interface, and wherein changing the display comprises modifying the amount of time the primary representations of one of the plurality of content pages are displayed.

8. The method of claim 1, wherein the step of displaying shows each of the plurality of content pages in the first portion one at a time and advances to a next content page in the plurality of content pages in response to input from a user.

9. The method of claim 1, wherein the virtual focus group user interface has a third portion for presenting at least one segment related to the one of the plurality of content pages of the primary representation being displayed.

10. The method of claim 9, wherein the segment is one from the group of customer ID, visit number, date visited, visit length, time spent on site, days since last visit, entry page, search engine, search term, products purchased, orders and visit value.

11. The method of claim 1, wherein the virtual focus group user interface includes an information box for displaying additional information about the one of the plurality of content pages corresponding to the primary representation, the additional information including one from the group of a name of the content page, a time the visitor spent on the content page, an event that occurred on the content page, and a number of refreshes of the content page that the visitor performed.

12. The method of claim 1, wherein during displaying the retrieved information as a simulation
the first slide deck icon is representative of a first portion of the plurality of content pages that have already been displayed in the simulation and
the second slide deck icon is representative of a second portion of the plurality of content pages that are to be displayed in the simulation.

13. The method of claim 1, wherein the virtual focus group user interface includes a selectable tab for displaying, in response to user selection, a list of previous visits to a network site included in a report.

14. A non-transitory computer-readable storage medium storing computer-executable program modules for simulating a previously captured interaction with content pages by a visitor, the computer-executable program modules comprising:
an analytics tool storing data regarding a plurality of previous content page visits;
a user interface module for generating a display of a simulation of one of the previous content page visits, wherein the display depicts a flow of content pages accessed by the visitor during the previous content page visit and a pace of transitions between the content pages accessed by the visitor during the previous content page visit, wherein the display comprises:
a first portion for displaying a primary representation of one of the content pages accessed by the visitor during the previous content page visit; and
a second portion displaying a representation of the plurality of content pages previously accessed by the visitor during the previous content page visit visually arranged in sequence according to an order in which the content pages were accessed by the visitor during the previous content page visit and providing a visual indication of a position of the content page displayed in the first portion relative to the plurality of content pages visually arranged in sequence, wherein the second portion displayed comprises:
a first slide deck icon comprising a first stack of slides representative of one or more of the plurality of content pages that were accessed by the visitor during a first portion of the previous visit that occurred prior to accessing the content page displayed in the first portion, wherein the number of slides in the first stack of the first slide deck corresponds to a number of the one or more of the plurality of content pages accessed during the first portion of the visit; and
a second slide deck icon comprising a second stack of slides representative of one or more of the plurality of content pages that were accessed by the visitor during a second portion of the previous visit that occurred subsequent to accessing the content page displayed in the first portion, wherein the number of slides in the second stack of the second slide deck corresponds to a number of the one or more of the plurality of content pages accessed during the second portion of the visit; and
a focus group module for extracting data from the analytics tool related to the one of the previous content page visits, the focus group module coupled to the user interface module and the analytics tool.

15. The computer-readable storage medium of claim 14, wherein the analytics tool further comprises data storage for storing data related to the plurality of previous content page visits, and wherein for each of the plurality of content page visits the data storage includes:
   a representation of each content page as viewed by the visitor during the content page visit;
   a length of time the visitor viewed each content page during the content page visit;
   an order in which the content pages were viewed during the content page visit; and
   at least one segment related to one of the content pages viewed during the content page visit.

16. The computer-readable storage medium of claim 14, wherein the user interface module generates a display of a primary representation of content pages in the first portion for a period of time that is proportional to an amount of time that the content page was viewed by the visitor during the previous content page visit.

17. The computer-readable storage medium of claim 14, wherein the user interface module is responsive to input from the user and modifies the display rate of the content pages in the simulation in response to the input from the user.

18. The computer-readable storage medium of claim 14, wherein each of the plurality of content pages previously accessed by the visitor during the previous content page visit are visually arranged in sequence according to an order in which a primary representation associated with each of the at least two representations is to be displayed in the first portion during the simulation.

19. The computer-readable storage medium of claim 18, wherein the user interface module generates a display having a third portion for presenting at least one segment related to a content page of the primary representation displayed in the first portion.

20. The computer-readable storage medium of claim 19, wherein the segment is one from the group of customer ID, visit number, date visited, visit length, time spent on site, days since last visit, entry page, search engine, search term, products purchased, orders and visit value.

21. The computer-readable storage medium of claim 18, wherein the user interface module generates a display that includes an information box for displaying additional information about a content page corresponding to the primary representation, the additional information including one from the group of a name of the content page, a time the visitor spent on the content page, an event that occurred on the content page, and a number of refreshes of the content page that the visitor performed.

22. The computer-readable storage medium of claim 18, wherein during displaying the retrieved information as a simulation
   the first slide deck icon is representative of a first portion of the plurality of content pages that have already been displayed in the simulation and
   the second slide deck icon is representative of a second portion of the plurality of content pages that are to be displayed in the simulation.

23. The computer-readable storage medium of claim 14, wherein the user interface module generates a display that includes a selectable tab for displaying in response to user selection a list of previous visits to a network site included in a report.

* * * * *